United States Patent [19]
Senock et al.

[11] Patent Number: 5,481,090
[45] Date of Patent: Jan. 2, 1996

[54] SAP FLOW GAUGE

[75] Inventors: Randall S. Senock, Riley; Jay M. Ham, Manhattan, both of Kans.

[73] Assignee: Kansas State University Research Foundation, Manhattan, Kans.

[21] Appl. No.: 254,746

[22] Filed: Jun. 6, 1994

Related U.S. Application Data

[62] Division of Ser. No. 85,614, Jun. 30, 1993, Pat. No. 5,367,905.

[51] Int. Cl.⁶ ..................................... H05B 3/36
[52] U.S. Cl. .......................... 219/535; 219/549
[58] Field of Search .................... 219/535, 528, 219/529, 548, 549, 543

[56] References Cited

U.S. PATENT DOCUMENTS

| | | | |
|---|---|---|---|
| 1,240,871 | 9/1917 | Parrish | 219/535 |
| 1,260,441 | 3/1918 | Parrish | 219/535 |
| 3,296,415 | 1/1967 | Eisler | 219/528 |
| 3,344,392 | 9/1967 | Briscoe | 219/549 |
| 4,369,356 | 1/1983 | Tsurutani et al. | 219/535 |

*Primary Examiner*—Teresa J. Walberg
*Attorney, Agent, or Firm*—Hovey, Williams, Timmons & Collins

[57] ABSTRACT

A sap flow gauge (10) which can accommodate stem or other plant parts (S, S') of very small and/or varying cross-sectional configuration is provided which includes a generally U-shaped body (12) presenting a central bight portion (50), a pair of spaced, opposed legs (52, 54) and a stem-receiving passageway (56). The body (12) preferably includes a pair of spaced, endmost filler pads (16, 18) which support a bridging strip-type resistance heater (28). The heater (28) has one end thereof affixed to an adjacent filler pad (16), with the remaining end of the heater (28) thereof being free. A flux sensing thermopile (40), as well as spaced, temperature differential sensing thermocouple pairs (44, 46) are also supported by the central bight region of the body (12). In practice, the gauge (10) is applied to a stem (S, S') by wrapping the body (12) around the stem (S, S') with strip heater (28) in engagement with the stem (S, S'); the filler pads (16, 18), together with the free end of the strip heater (28) insure close, conforming, heat transfer engagement between the strip heater (28) and the stem (S, S').

1 Claim, 4 Drawing Sheets

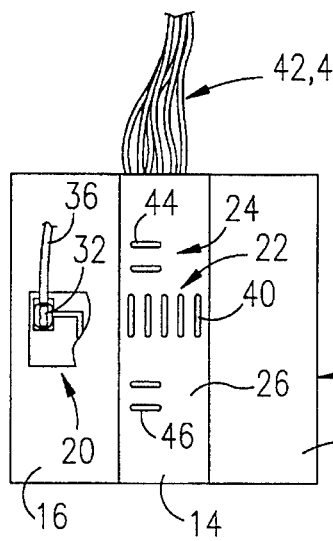
FIG. 1.
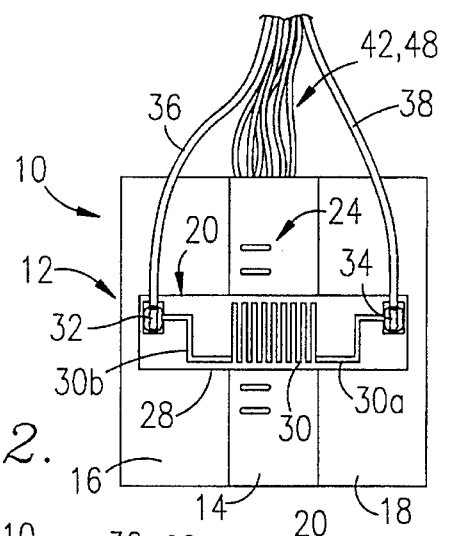
FIG. 2.
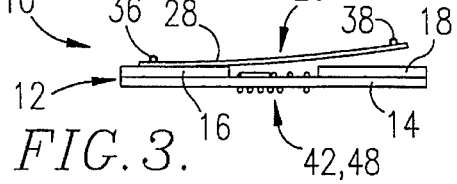
FIG. 3.
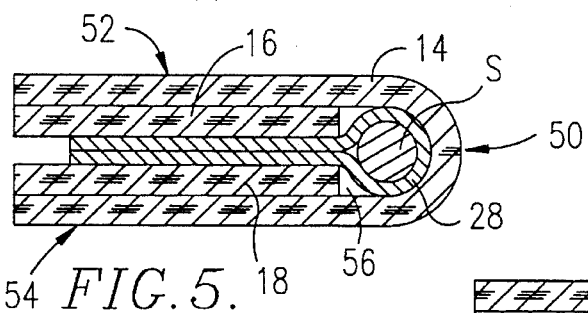
FIG. 5.
FIG. 7.
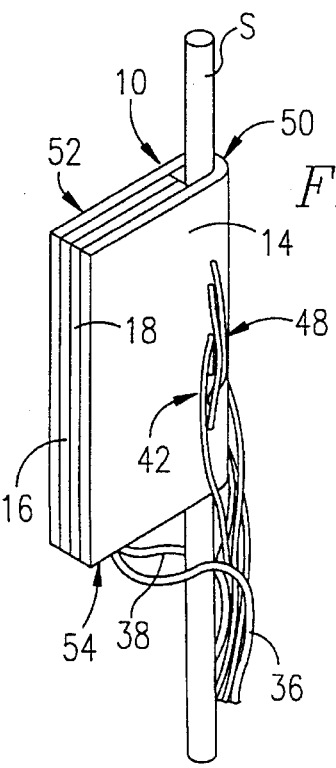
FIG. 4.
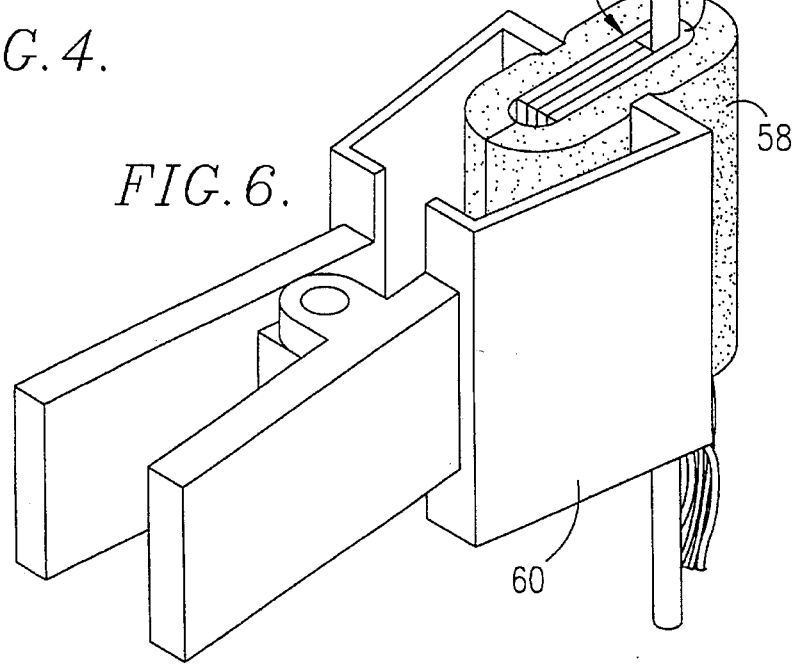
FIG. 6.

$-1/b = 15$ s
$r^2 = 0.994$

SAP FLOW GAUGE

This application is a division of application Ser. No. 08/085,614, filed Jun. 30, 1993.

BACKGROUND OF THE INVENTION

1. Field of the Invention

The present invention is broadly concerned with an improved heat balance sap flow gauge which is especially configured to accommodate irregular, non-circular, and/or very small diameter plant stems and parts and give valid sap flow testing results with such stems or parts. More particularly, the invention is concerned with such a sap flow gauge which is improved by provision of a U-shaped main body carrying a central heating element as well as radial heat flux and temperature differential sensors; in preferred forms, the U-shaped body is provided with filler means disposed between the legs of the U-shaped body for insuring proper engagement between the plant part and the bight heating means. The heating means advantageously is in the form of an elongated resistance heater strip, with one end of the strip being secured to the body and the other end thereof free.

2. Description of the Prior Art

Direct, accurate, non-invasive and continuous measurement and analysis of transpiration in herbaceous plants and trees has long been a goal of agronomists, The heat balance method for measuring plant water loss has provided a reliable technique and has been used on a wide variety of plant species in many diverse applications, Field studies have used sap flow gauges as a means of partitioning evapotranspiration for examining energy transport phenomena in agricultural settings. Other studies have used these gauges to examine water use, the effects of growth retardants on horticultural plants in urban environments and to measure water loss in natural ecosystems.

The theoretical basis for the heat balance method is based upon thermal flow meter techniques used for measuring gas flow rates through a contained volume by applying heat over a short region and measuring the resulting temperature distribution and heat fluxes within the heated segment. Application of this technique to plant stems and a thorough discussion of the mathematical equations are provided by: Sakuratani, *Jap. Agricultural Meteorology*, 37:9–17 (1981) and Baker et al., *Plant, Cell and Environment*, 10:777–782 (1987).

Briefly, however, the heat balance method uses energy balance concepts to account for the heat fluxes within an insulated segment of plant stem. The energy balance of a heated plant stem can be defined as $$Q = Q_v + Q_r + Q_f + S \qquad (1)$$

where Q represents the heat energy supplied, $Q_v$ is the apical and basal heat energy transferred by conduction along the stem axis, $Q_r$ is the radial conduction of energy perpendicular to the stem axis, $Q_f$ is the heat energy transported by the mass flow of water, and S is the rate of change in heat storage of the stem segment, all with units of watts (W). convective energy flux in the sap can be defined as $$Q_f = cF(T_{so} - T_{si}) \qquad (2)$$

where c is the specific heat of water (J/kg·K), F is the rate of water flow in the stem (kg/s), and $T_{so} - T_{si}$ is the temperature difference between the water flowing into and out of the heated segment. S is typically neglected because of the assumption of steady state conditions in the system. By substituting eqn 2 into eqn 1, the formulation of a mass flow equation for the heated stem segment is $$F = (Q - Q_v - Q_r)/(c(T_{so} - T_{si})) \qquad (3)$$

An important variable in calculating F is the estimate of the gauge conductance, $K_g$, which is used in determining $Q_r$. Values for $K_g$ are found by setting F=0 in eqn 3, solving for $Q_r$, and dividing by the thermopile output. Sap flow rates close to zero can be obtained from excised stems or by using low night-time flow rates and assuming that sap flow is zero.

In most cases, published field studies have used large mature plants with stems larger than 10 mm in diameter and mainly with circular stem radial geometries. One study (Sakuratani, *Jap. Agricultural Meteorology*, 45:277–280 (1990)), investigated plants with stem diameters smaller than 10 mm, but the species used had a stem with a circular radial geometry, and the gauge design employed did not allow for easy gauge placement and removal. Large stem diameters with circular geometries allowed easy application of typical rigid cylindrical sap flow gauges. Stem diameters of dicot seedlings may be less than 10 mm, while many mature domesticated monocots have stems of 5 mm or less in diameter. Furthermore, stem geometries of many dicot seedlings are not circular, and the geometries of many native monocots are highly elliptical.

One prior sap flow gauge is in the form of a cylindrical member supporting an internal stem heater having resistance heating elements uniformly positioned along the length thereof. The cork backing of the member is composed of three individual pieces of cork, one for the heater and thermopile, and two separate pieces for the upper and lower thermocouple pairs. Different stem sizes are accommodated by altering heater length and width. However, adjusting the heater length for stem diameters near 5 mm or smaller is difficult, because the wire leads needed for input voltage interfere with the stem-heater interface. Also, the provision of three cork pieces makes it difficult for this prior gauge to accommodate non-circular plant stems.

There is accordingly a need in the art for an improved sap flow gauge which can more readily accept small and non-circular stems or plant parts, while at the same time giving accurate stem flow measurement results.

SUMMARY OF THE INVENTION

The present invention overcomes the problems outlined above, and provides an improved sap flow gauge in the form of a generally U-shaped body having a central bight portion and a pair of spaced opposed legs. The bight portion presents a passageway therethrough for receiving a plant part such as a stem, with the legs extending generally laterally from the plant part. The overall gauge also includes heating means adjacent the bight and oriented for heating the plant part received within the passageway. Means is provided for sensing radial heat flux and temperature differential values exhibited by the plant part in response to heating thereof by the heating means.

Preferably, filler means is disposed between the legs of the body and located proximal to the plant part for insuring proper engagement between the plant part and heating means, when the gauge is applied to a plant part. Additionally, the heating means is advantageously in the form of a elongated strip supporting a resistance heater element, with one end of the strip being secured to the body, while the other end thereof is free.

In actual practice, the U-shaped body is formed of cork-neoprene gasket material and has a pair of filler pads (likewise formed of the gasket material) secured to each of the inner faces of the body legs. The radial heat flux sensing means comprises a multiple-junction thermopile carried by the bight portion adjacent the heating means. The temperature differential sensing means includes a pair of spaced thermocouples supported on the bight on opposite sides of the thermopile.

In use, the U-shaped body is positioned about a stem or other plant part, with the heater element engaging the plant part. A jacket of thermal insulation material is when applied to the U-shaped body, and a releasable spring clip is affixed for releasably pressing the legs of the body together. This causes the filler pads to close against the heating strip and insure close engagement between the plant part and heating strip. It will also be appreciated that the attachment of the heating means with one end thereof free insures that the heater will firmly wrap around and engage substantially all of the outer surface of the plant part.

Appropriate leads are secured to the heating element and sensors, and these are in turn connected with conventional monitoring apparatus.

BRIEF DESCRIPTION OF THE DRAWINGS

FIG. 1 is a plan view of the primary body of the sap flow gauge of the invention, with the strip heating element removed to illustrate the construction and location of the bight sensors;

FIG. 2 is a view similar to that of FIG. 1, but illustrating the strip heating element affixed to the primary body;

FIG. 3 is a side view of the body depicted in FIG. 2 and illustrating the connection of the strip heating element;

FIG. 4 is an isometric view of the U-shaped gauge applied to a plant part;

FIG. 5 is a sectional view further illustrating the application of the gauge to the plant part;

FIG. 6 is an isometric view similar to that of FIG. 4, but depicting use of the external insulating jacket and spring clip;

FIG. 7 is a view similar to that of FIG. 5, but illustrating application of the gauge to a non-circular, generally elliptical in cross-section plant part;

DETAILED DESCRIPTION OF THE PREFERRED EMBODIMENTS

Figure 8A:
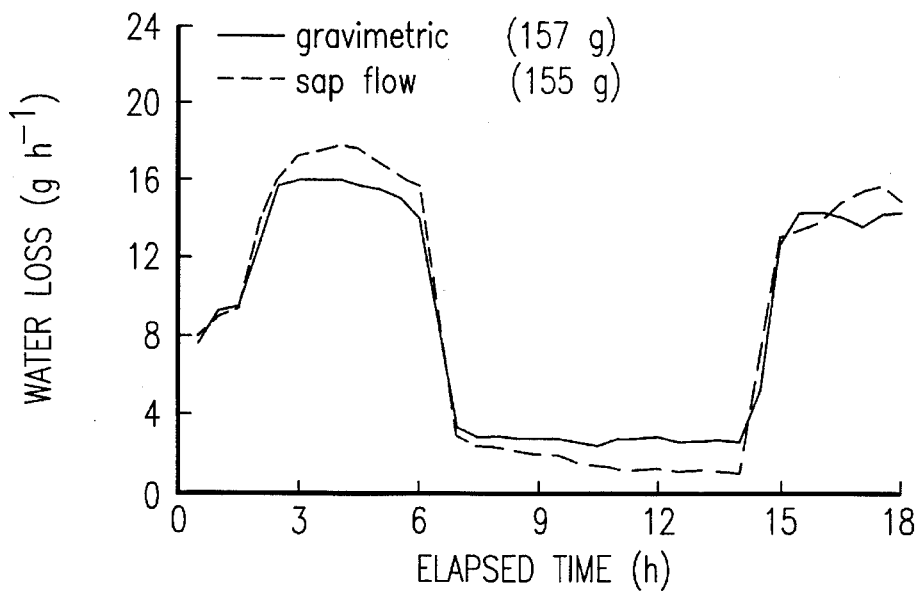
FIG. 8A is a graph depicting the performance of the gauge of the invention (dotted line) versus results from gravimetric measurements (full line), with a soybean seedling having a stem diameter of about 3 mm.

Turning now to the drawings, and particularly FIGS. 1–3, a sap flow gauge 10 is depicted. Broadly speaking, the gauge 10 includes a main body 12 having a planar substantially square (e.g., 50 mm×50 mm) primary panel 14 carrying a pair of adhesively secured, laterally spaced apart, endmost filler pads 16, 18. In addition, the overall gauge 10 includes heating means 20 as well as means 22, 24 for sensing radial heat flux and temperature differential values exhibited by a plant part in response to heating thereof.

In more detail, the main panel 14 and filler pads 16, 18 are preferably formed of flexible neoprenecork automotive gasket material having a thickness of 2 mm. As best seen in FIGS. 1 and 3, the filler pads 16, 18 are secured to the end regions of the primary panel 14, to define a recessed region 26 therebetween. As best seen in FIG. 2, the filler pads 16, 18 have a width which is greater than the width of the recessed region 26 therebetween.

Heating means 20 is in the form of an elongated Kapton-film electrical resistance heater (Heater Designs, Inc., Bloomington, Calif.). As illustrated in FIG. 2, the heating means includes a dielectric Kapton backing strip 28 which supports a resistance heating element 30 which is situated primarily in the region between the filler pads 16, 18. In addition, a pair of terminals 32, 34 are provided adjacent the opposed ends of the strip 28, and appropriate wire leads 36, 38 are affixed to these terminals. In this regard, the heating element 30 is situated centrally on the strip 28, and integral connector leads 30a, 30b extend from the ends of element 30 to the terminals 32, 34. It will be seen that the length of each of the end regions of strip 28 are at least equal to the length of the central resistance heater element 30. The connector leads 30a, 30b are of sufficient thickness relative to heating element 30 so that essentially no heat is generated by passage of current through the connector leads. This configuration insures that all plant part heating is generated in the central region of the strip heater. As best illustrated in FIG. 3, one end of the strip 28 is adhesively secured to filler pad 16, whereas the remaining end of the strip 28 is free. Note also that the strip 28 is of sufficient length to effectively bridge the distance between the pads 16, 18.

The flux sensor 22 is in the form of a thermopile 40 (10–14 junctions) constructed from 0.127 mm diameter (36 AWG, American Wire Gauge) copper and constantan wires. The thermopile wires are woven into primary panel 14 as shown, in the recessed region 26 between the pads 16, 18. Appropriate thermopile electrical leads 42 extend from the rearmost surface of panel 14 as shown.

Temperature differential sensor 24 is in the form of two pairs of thermocouples 44 and 46 located above and below the flux sensor 22 and mounted on the inner face of primary panel 14 between the pads 16, 18. Appropriate electrical leads 48 extend from the rear surface of primary panel 14 as shown. In the illustrated embodiment, the spacing between the thermocouples and the heater, as well as between the thermocouple pairs is 3 mm.

In the use of gauge 10, the body 12 is folded about an elongated plant part such as a stem S to achieve a generally U-shaped configuration as shown in FIGS. 4 and 5, thus presenting a central arcuate bight 50 and a pair of spaced opposed legs 52, 54, as well as an open-ended passageway 56. As best seen in FIG. 5, the legs 52, 54 have a length corresponding to the width of the pads 16, 18, with such length being greater than the maximum transverse dimension of passageway 56. This geometry is important in order to accommodate smaller diameter and non-circular stems or plant parts. Again referring to FIG. 5, the stem S is received within the passageway 56, with the strip heater 28 wrapped around a substantial portion of the outer surface of the stem. The portions of the strip 28 overlying the filler pads 16, 18 are pressed into contact with each other, with the pads thus insuring a firm contact between stem S and the central resistance heater 30 carried by the strip 28. This configuration also insures that the leads 36, 38 do not interfere with heater-plant part contact in the passageway 56.

The complete assembly for sap flow measurement is illustrated in FIG. 6. In particular, a jacket 58 of flexible foam insulating material is applied around the U-shaped body 12, and a conventional spring clip 60 is attached to hold the entire assembly in place on stem S. In this connection, the laterally extending legs 52, 54 and the surrounding jacket 58 provide an unobstructed gripping region for the clip 60 and prevent interference with the wire leads or the other functional components of the gauge 10.

As indicated above, the present invention can readily accommodate stems or other plant parts of non-circular cross-section. For example, as illustrated in FIG. 7, a generally elliptical stem S' is depicted with the gauge 10 applied thereto. In this regard, it will be seen that the strip heater 28 can wrap about substantially the entire outer surface of the stem S', just as in the case of circular stem S illustrated in FIG. 5. Provision of the resistance heating element 30 in the central bight region of the body 12, together with the free, unconnected end of the strip 28, allows the heater 28 to conform with such non-circular plant parts.

In measurement operations, the gauge 10 is applied to a plant part as illustrated, and the wire leads 36, 38 from strip heater 28 are connected to a DC power supply. The remaining leads 42, 48 from the thermopile 40 and thermocouple pairs 44, 46 are connected with a data logger or other conventional controller.

EXAMPLE

Several gauges of the type described above were constructed and tested on container grown Glycine Max (soybean) [(L.) Merr. var Williams 82] plants in the laboratory under two high pressure sodium lamps (LU 400, Energy Technics, York, Pa.). Tests were then performed in a greenhouse under normal diurnal patterns of solar radiation and temperature. Voltage input to the gauge heaters was supplied with a DC power supply (Hewlett Packard 6284A, Berkeley Heights, N.J.). Gauge signals were sampled every 15 seconds with a data logger (21X, Campbell Scientific Ltd., Logan, Utah) and stored as 15- or 30-minute averages. Gauge measurements of sap flow rates were compared with gravimetric measurements of water loss obtained from an electronic balance. Before each test, pots were well watered, allowed to drain and sealed in plastic bags to minimize soil evaporation. During testing, the gauges were surrounded with insulation and shielded from radiation with aluminum foil.

FIG. 8A presents an example of results from a laboratory test on a soybean seedling having a stem diameter of 3 mm, and shows that gauge estimates of sap flow closely tracked gravimetric measurements of transpiration. The gauge was placed directly above the cotyledons where stem geometry was square with a unit side length s=3 mm. Leaf area (one-sided) of the plant was approximately 0.18 m$^2$. For this particular test, the cumulative flow estimate from the gauge (155 g) was only 2% less than the gravimetric measurement of water loss (157 g). All laboratory gauge estimates were consistently within ±5% of gravimetric water losses.

Figure 8B:
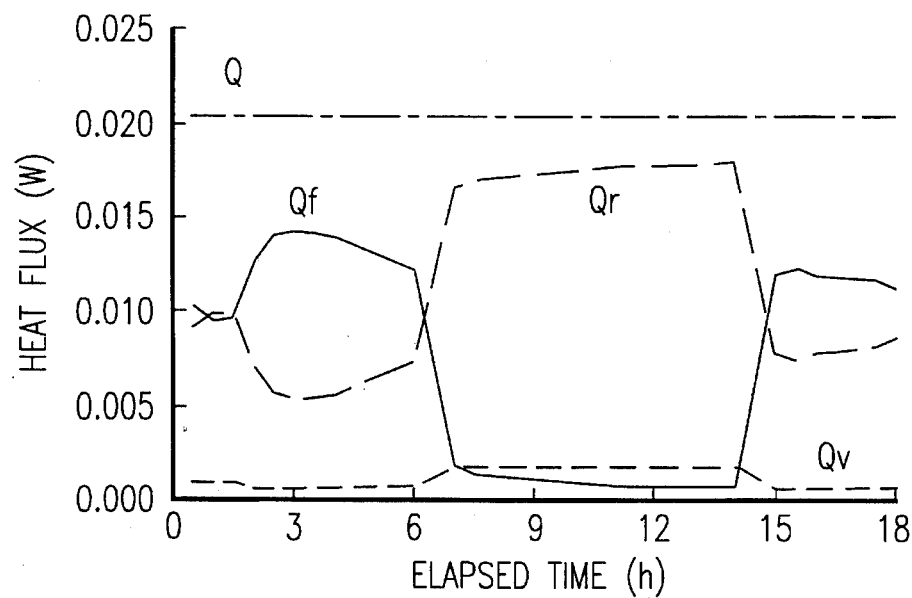
FIG. 8B is a graph depicting the heat balance components recorded during the soybean seedling test where Q=power input, $Q_f$=convective heat flux, $Q_r$=radial heat flux, and $Q_v$=axial heat flux.
Figure 8C:
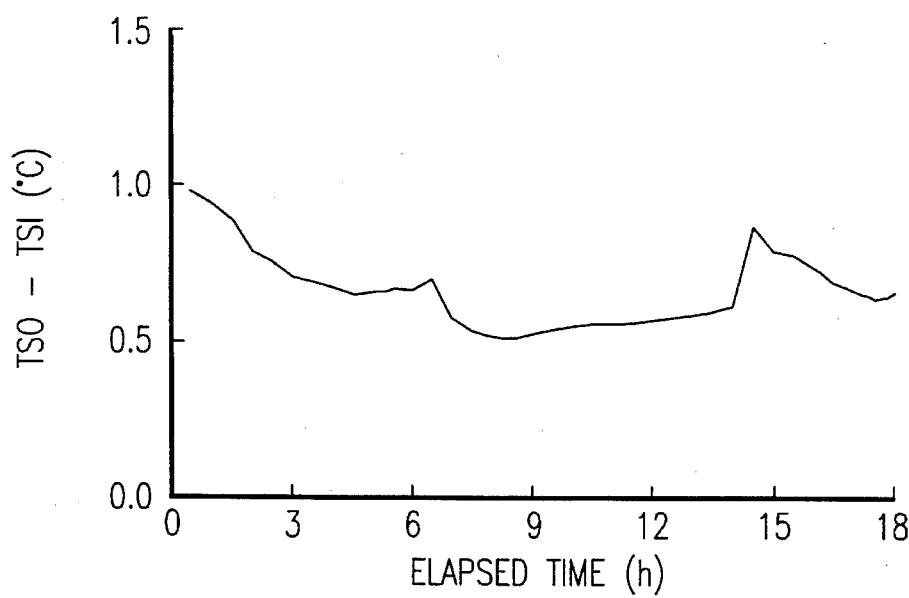
FIG. 8C is a graph of $T_{so}-T_{si}$ during the soybean seedling test of FIGS. 7A–7B.

Dynamic responses of the heat balance components during this test demonstrated the comparative importance of different heat fluxes at different flow rates (see FIG. 8B). During periods of low flow, $Q_r$ is the dominant flux component of the total power input (Q). During high flow, however, $Q_f$ becomes the dominant flux component and the relative importance of $Q_r$ diminishes. $Q_v$ was consistently a minor flux component regardless of flow rate. Such relative patterns of heat flux components are consistent with prior data collected from larger stems (Steinberg et al.; *Agronomy Journal*, 82:51–854 (1990); Dugas, *Theoretical and Applied Climatology*, 42:215–221 (1990); Ham et al., *Agricultural and Forest Meteorology*, 52:287–301 (1990)). However, in contrast to previous studies where $T_{so}$–$T_{si}$ varied from 1.0°–7.0° C. when flow rates changed, fluctuations in $T_{so}$–$T_{si}$ in this test were minimal (0.5°–1.0° C.) with no apparent relationship to sap flow (FIG. 8C).

Another greenhouse test was performed to demonstrate the performance of the gauge under changing soil water regimes. The test used the same type of plant described above, with the gauge being placed immediately above the cotyledons where the stem was square (s=4 mm) and left undisturbed for a period of 5 days. Plant height was approximately 0.5 m and total leaf area (one-sided) was 0.29 m$^2$.

Figure 9:
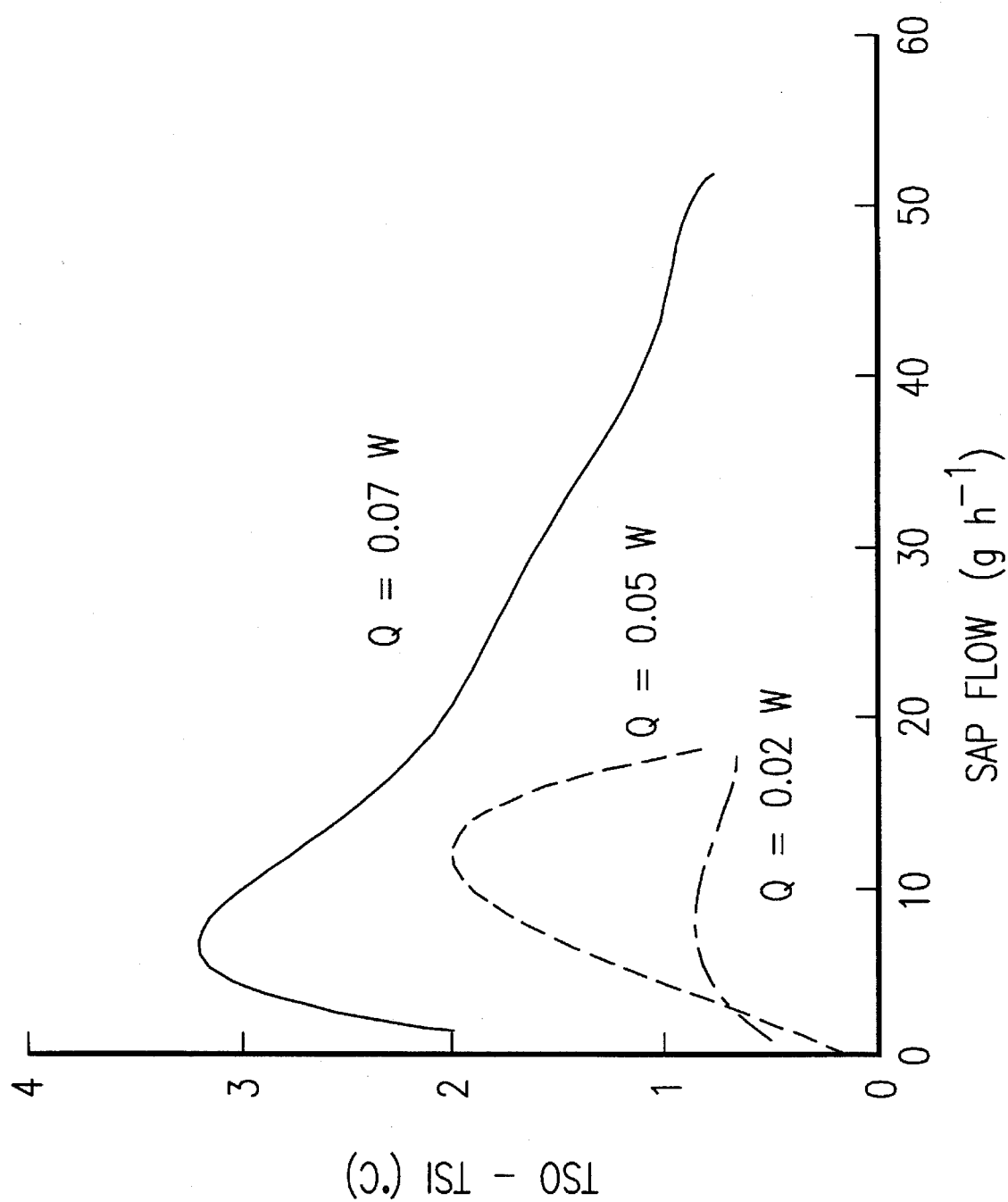
FIG. 9 is a graph of $T_{so}-T_{si}$ in relation to sap flow rate at different input power (Q) levels.

Results from a greenhouse test over 5 consecutive days (4–8 Sept.) demonstrate the performance of the gauge under changing soil water regimes (FIG. 9). For this test, the gauge was again placed immediately above the cotyledons where the stem was square (s=4 mm) and left undisturbed for the entire period. Plant height was approximately 0.5 m and total leaf area (one-sided) was 0.29 m$^2$. Clear skies predominated with daily total global irradiance in the greenhouse close to 5.0 MJ m$^{-2}$ d$^{-1}$ (pyranometer, Model 8-48, Eppley Laboratory, Newport, R.I.) and air temperatures ranged from 19°–32° C. Soil water availability was near saturation at the start of the test, and no additional water was supplied until the evening of the fourth day when the pot was again well watered. Gravimetric water loss reached a maximum near 50 g/h on the first day, steadily declined thereafter as soil water was depleted and recovered to 30 g/h after rewatering. Based on total plant leaf area, the range of water loss rates corresponded to average transpirational molar fluxes of 0.5–2.7 mmol m$^{-2}$ s$^{-1}$.

With high soil water availability on days 1 and 5, the gauge and gravimetric measurements for both the 15-minute averages and daily totals generally correlated well (Table). With adequate soil water, the midday absorption lag in sap flow may have been the result of hydraulic capacitance and internal plant resistances to water flow. On subsequent days, the sap flow estimates steadily declined until day 4 when the cumulative measured sap flow was only 55% of the gravimetric water loss. The increasing discrepancy between the two estimates could be explained by neglect of the heat storage term (S) in the energy balance equation, errors in heat flux or temperature measurements during low flows, or decreased plant absorption as soil water was depleted.

The following table summarizes the results of this test, and sets forth daily total global irradiants ($R_s$), maximum and minimum air temperatures ($T_a$), maximum stem surface temperature ($T_s$), midday soil water content (w) and availability, minimum predawn gauge conductance values ($K_g$) and sap flow gauge accuracy for 5 consecutive September days in a greenhouse located at Manhattan, Kans. The plant was rewatered at the end of day 4.

TABLE

| Day | $R_s$ (MJ m$^{-2}$ d$^{-1}$) | $T_a$(°C.) Max | $T_a$(°C.) Min | $T_s$ (°C.) Max | w (g$^{-1}$) | % H$_2$O[1] available | $K_g$ (W) | accuracy[2] (%) |
|---|---|---|---|---|---|---|---|---|
| 1 | 5.0[3] | 30 | 19 | 35 | 0.83 | 131 | 0.625 | −3.6 |
| 2 | 5.4 | 30 | 21 | 35 | 0.55 | 62 | 0.733 | −7.8 |
| 3 | 5.2 | 30 | 24 | 37 | 0.38 | 25 | 0.771 | −31.5 |
| 4 | 5.3 | 31 | 24 | 39 | 0.29 | 9 | 0.821 | −45.5 |
| 5 | 5.1 | 32 | 26 | 34 | 0.80 | 113 | 0.811 | −2.2 |

[1]calculated from soil water release data and the equation $M_w - M_{wmin})/(M_{w(-0.03MPa)} - M_{wmin})$ where $M_w$ was the amount of water (g) contained in the pot, at noon, for a particular day, $M_{wmin}$ was the amount of water present at the minimum water content (g g$^{-1}$) recorded during the study, and $M_{w(-0.03MPa)}$ was the amount of water present at a soil water potential of −0.03 MPa.

[2]difference between diurnal cumulative gauge and gravimetric water loss measurements divided by the gravimetric total.
[3]outer surface of greenhouse was coated with whitewash to reduce irradiance penetration.

Potential sources of errors in sap flow measurements

The rate change in heat storage is often ignored when applying the heat balance technique. This approach has largely been accepted, particularly for stems of herbaceous plants where, because the small size of the heated segment and the near steady-state conditions, the magnitude of heat storage capacities are small in relation to the other components of the energy balance. Over short periods of time, however, systematic errors could theoretically be corrected to improve sap flow estimates. To determine if the effect of neglecting S was significant on days 3 and 4, the estimate flow rates were recomputed using the absolute stem temperatures measured immediately above and below the heated stem segment. The rate change in heat storage was computed as $$S = V \cdot C_v \cdot (\Delta T/\Delta t) \quad (4)$$

where V is the volume of the stem segment (,$^3$), $C_v$ is the volumetric heat capacity of the stem tissue (J/m$^3$·K), and $\Delta t/\Delta t$ is a finite difference estimate of the rate change in stem temperature (K/s). The stem segment temperature was determined by averaging the upper and lower thermocouples closest to the heater. The volume of the segment was 126 mm$^3$, and $C_v$ was held constant at 4,175 J/m$^3$·K. Results showed that including S in the stem energy balance adjusted the flow estimates by less than 1 g/d for the cumulative totals and did not noticeably alter the diurnal patterns. Values of S ranged from −0,001 to 0.002 W over the course of the day and were always less than 3% of the total heat flux. Including S in the flow estimates on days 1, 2, and 5 when flows were higher produced similar results. This is in contrast to Groot et al., *Agricultural and Forest Meteorology*, 59:289–308 (1992) who speculated that including S in the stem energy balance improved the diurnal performance of a sap flow gauge attached to a conifer seedling with a stem diameter of 6 mm. In this study, the concurrent gravimetric measurements of water loss confirmed that S had no significant effect on the flow measurements. The primary reason that S was insignificant in the flow measurements was the small stem volume.

As in the laboratory tests results depicted in FIGS. 8A–8C, the dominant heat flux during periods of maximum flows on 1, 2, and 5 was $Q_f$. In contrast, as flow rates decreased on days 3 and 4, $Q_r$ was the dominant flux even as flow rates approached the daily maximums. This change in the dominating flux component at maximum flow rates ($Q_f$ vs $Q_r$) has implications for potential errors in sap flow estimates. In the flow equation, the heat fluxes Q, $Q_v$, and $Q_r$, and the system $T_{so} - T_{si}$ are obtained from direct sensor output and $Q_f$ is calculated as the residual energy flux. With Q being a constant and $Q_v$ usually a minor portion of the total heat balance, $Q_r$ and $T_{so} - T_{si}$ become the most important factors in estimating sap flow rates. Furthermore, the relative importance of $Q_r$ and $T_{so} - T_{si}$ depends on the flow rate and which heat flux dominates the stem energy balance.

During periods of higher flows, when the importance of $Q_r$ decreases and $Q_f$ dominates the energy flux, sap flow estimates become more sensitive to errors in $T_o - T_i$. Sample calculations from day 1, when the highest sap flows (>50 g/h) occurred, showed that a 0.1° C. error in $T_{so} - T_{si}$ would have caused a 15% error in F. At the same time, a 10% error in $Q_r$ would have caused only a 6% error in F. In contrast, on day 4, when the maximum flows were much lower (6 g/h), a similar error in $T_{so} - T_{si}$ and $Q_r$ would have resulted in a 3% and 25% error in F, respectively. Thus, at high flows, the gauge is susceptible to errors in $T_{so} - T_{si}$, and, at low flow rates, the gauge is sensitive to errors in $Q_r$. On day 4, when $Q_r$ was the dominant heat flux, the large difference between the gauge and gravimetric water loss rates could have been due to errors in $Q_r$.

Sap flow gauges, however, only measure water movement through the plant stem and not actual water transpired from the plant to the atmosphere. When plant water uptake is restricted by soil water availability, sap flow rates measured with a gauge may not accurately reflect gravimetrically measured water loss rates which represents transpiration. Soil water availability on days 3 and 4 had declined to 25% and 9% respectively, of initial available water (Table). On day 4, plant leaves were noticeably wilted, suggesting that tissue hydration was not being maintained and plant water absorption was severely limited. Thus, differences between the gravimetric and gauge estimated water loss on those days may simply have resulted from decreased plant water uptake from the soil. However, a more detailed investigation, simultaneously measuring plant tissue water content or water potential and soil water availability, would be needed to distinguish between plant desiccation and errors in sap flow estimates.

Gauge operation

Successfully operating sap flow gauges requires a procedure for determining $K_g$ and the proper power input, Q. The Table results were obtained using pre-dawn $K_g$ values, when gravimetric water loss rates were typically near 1 g/h (Table). The 30% increase in $K_g$ through day 4 may have been due to declining soil water availability that resulted in lower stem water content. Fluctuating stem water content would affect the residual $K_g$ estimate by altering the estimate of $Q_v$ and the resultant estimate of $Q_r$. Lower stem water content would mean different volumetric proportions of water and cellulose, which directly affects stem thermal properties. Decreasing water content may also cause the stem diameter to shrink and alter the thermocouple stem surface contact, resulting in errors in $Q_v$. Either scenario would explain the small decrease in $K_g$ on day 5 after watering on the previous evening.

On a comparative basis, only small errors (<10%) in sap flow estimates are produced by large errors (>10%) in $K_g$ during high flows. However, at low flows, with the dominance of $Q_r$, even small errors in the value of $K_g$ have the potential to cause large errors in flow estimates. The $K_g$ value determined by stem excision at the end of the experiment (0,782 W/V) was within the range of daily values used. However, the use of the single stem excision $K_g$ value for calculating the individual daily sap flow estimates substantially altered (3–10x) the accuracy of the gauge estimates on days 1, 2, and 5 and did not improve gauge accuracy on days 3 and 4. These results suggest that the use of daily pre-dawn $K_g$ values in calculating sap flow is preferable to using a single value of $K_g$ determined by stem excision when working in a lower range (<50 g h$^{-1}$) of sap flow rates.

Another important aspect of the gauge's operation is the response of $T_{so}-T_{si}$. This temperature difference is estimated by the sensors located on the stem surface and is assumed to provide an accurate measure of the xylem fluid on the same radial plane as the sensors. When soil water availability was greatest on days 1, 2 and 5, $T_{so}-T_{si}$ initially increased and then rapidly decreased as flow rates approached the diurnal maximums. This response pattern is due to a distortion of the isothermal field in the direction of flow. When the largest portion of the heat balance is due to convection, $T_{so}-T_{si}$ becomes the most important component in the computed flow rates, and errors in estimating $T_{so}-T_{si}$ become more probable because of strong temperature gradients at the outer stem edge. The partial derivative of eqn 3 with respect to $T_{so}-T_{si}$ $$F/(T_{so}-T_{si}) = -Q_f/(C(T_{so}-T_{si})^2) \qquad (4)$$

demonstrates that changes in F are proportional to $Q_f$ and inversely proportional to $T_{so}-T_{si}^2$. Thus F is especially susceptible to errors when $Q_f$ is large and $T_{so}-T_{si}$ is less than 1.0° C.

Because stem thermal conductivity is a system constant and small stem sizes places limits on heater size, the only alternative in adjusting the magnitude of $T_{so}-T_{si}$ is by varying Q. Because of physiological considerations and errors associated with the magnitude of gauge signals, however, limits on Q also exist. Proper selection of Q and thus $T_{so}-T_{si}$, becomes important for a particular plant. FIG. 9 shows that when Q=0.07 W, the $T_{so}-T_{si}$ versus sap flow relationship assumed the typical response curve, whereas at lower Q, the curves lost the characteristic shape even though gauge accuracy (< ±5%) among the tests were not different (see also FIG. 7C). Adjustments in Q typically do not improve gauge performance at high flow rates. However, the relationship between $T_{so}-T_{si}$ and sap flow may provide a diagnostic tool for determining optimum Q under conditions of high soil water availability.

The physical impact of using Q=0.07 W on the plant was evident by stem surface temperatures that ranged from 208° C. higher than air temperatures (Table). With similar diurnal maximum air temperatures over time, the higher stem surface temperatures on days 3 and 4 apparently were related to lower flow rates. Under low flow conditions, heat is not transported out of the gauge by convection and remains contained within the gauge region by the foam insulation. Although stem temperatures approached 40° C. for 2 days, physical damage to the stem surface was much less than expected and apparently did not restrict sap flow on day 5. In addition, at Q=0.07 W for the greenhouse test, $T_{so}-T_{si}$ was maintained above 1° C. As previously mentioned, because $T_{so}-T_{si}$ is in the denominator of the flow equation, it becomes important to maintain an adequate temperature difference and to prevent $T_{so}-T_{si}$ from approaching zero at high flows. Underestimating $T_{so}-T_{si}$ during high flows then leads to large overestimates of sap flow. The problems of stem heating under low flow conditions and potential errors in calculations at high flows could be addressed by suing the variable heating methods. The variable heating method maintains a constant $T_{so}-T_{si}$ by adjusting Q in response to changes in F. During low flow on days 3 and 4 in this study, $T_{so}-T_{si}$ was quite steady (2.5–3.0 C) and was not strongly influenced by diurnal changes in flow. Thus, it is unlikely that a power controller would have improved the final results.

Gauge response

Figure 10:
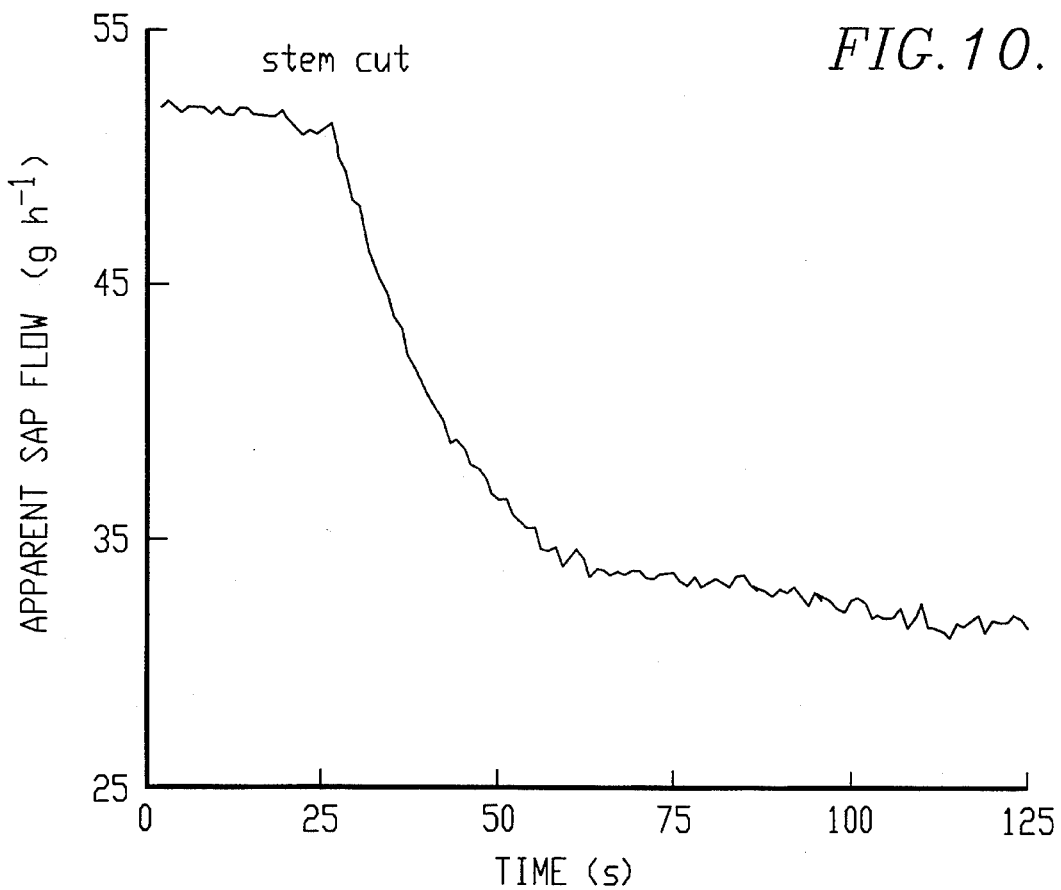
FIG. 10 is a graph illustrating change in apparent sap flow rate following stem excision recorded every 1s.
Figure 11:
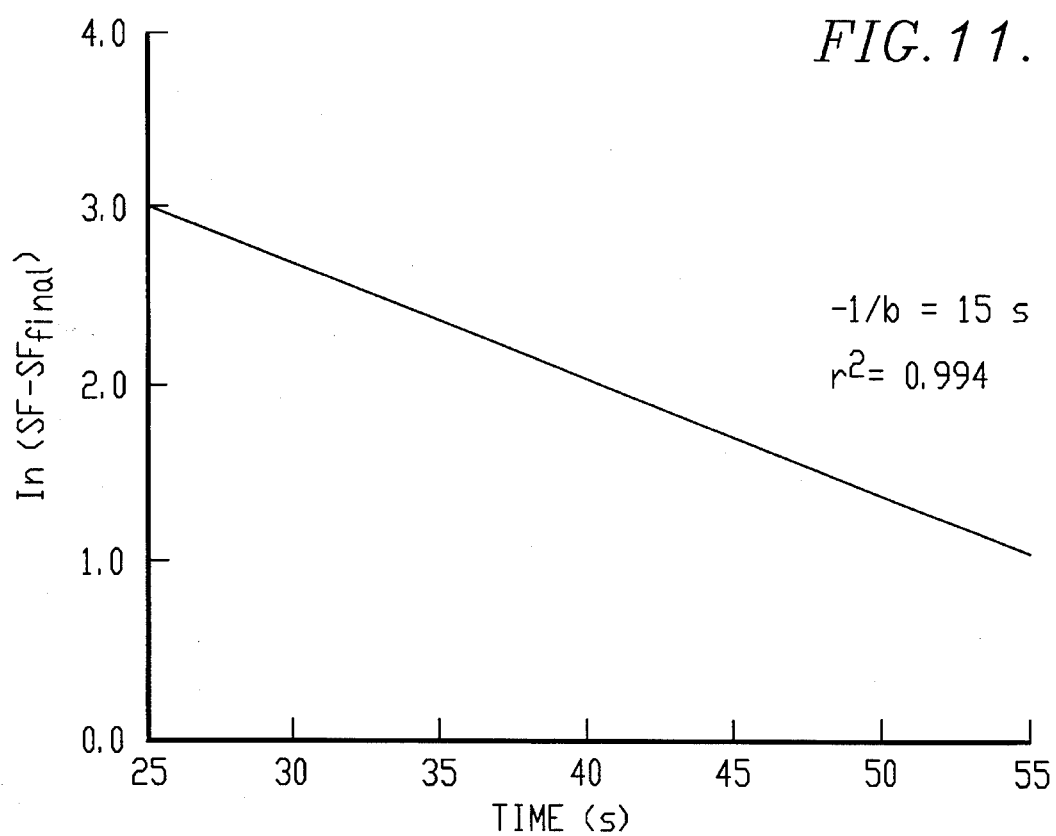
FIG. 11 is a graph illustrating the system time constant derived from the difference from initial (SF) and final ($SF_{final}$) sap flow rate with the latter value being 63% of the initial rate.

Dynamic response of the gauge hereof was evaluated by the time constant method (Kucera et al.; *Biologia Plantarum*, 19:413–420 (1977)) using a step change in a sap flow rate and calculating the time required for the gauge to register a 63% difference. Regression analysis of the response was then used to compute the time constant assuming a first order model (Jordan, *Instrumentation and Measurement for Environmental Sciences, American Society of Agricultural Engineers*, Chap. II (1983)). The step change was caused by severing the plant stem immediately above the gauge during the high flow period. The plant used for this test was the same from which the greenhouse results were obtained. FIG. 10 shows that at a flow rate near 50 g/h, the gauge time constant was 15 s. This is much less than the 20 minute time constant reported for small trees and 5–20 minutes for other herbaceous species. The lower response time can be attributed partly to the small mass of the heated segment (0.26 g) and partly to the relatively high flow rate. Even at a flow rate of 25 g/h, the small size of the heated stem segment should result, theoretically, in a time constant near 30 s. This rapid response to abrupt changes in flow rate would allow the gauge to be used in such physiological applications as stomatal response to atmospheric pollutants, the effects of blue light-stimulated stomatal conductance, or short-term radiation fluctuations within plant canopies.

We claim:

1. A resistance-type electrical heating element, comprising:

an elongated strip of dielectric synthetic resin material presenting a central region and a pair of opposed end regions;

a resistance heating element located only in the central region of said strip, the length of each of said end regions being at least equal to the length of said heating element; and a pair of terminal pads respectively electrically coupled with opposed ends of said heating element, each of said pads being located on a corresponding end region of said strip.

* * * * *